Figure 1:
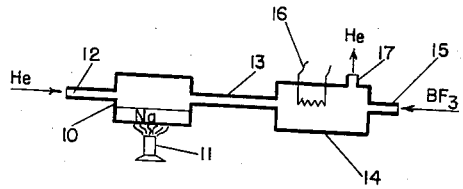

Aug. 3, 1954

J. S. SPEVACK 2,685,501

PROCESS FOR PREPARING BORON

Filed Aug. 28, 1945

*INVENTOR.*
JEROME S. SPEVACK

BY

Patented Aug. 3, 1954

2,685,501

UNITED STATES PATENT OFFICE 2,685,501

PROCESS FOR PREPARING BORON

Jerome S. Spevack, New York, N. Y., assignor to the United States of America as represented by the United States Atomic Energy Commission Application August 28, 1945, Serial No. 613,161

4 Claims. (Cl. 23—209)

The present invention relates to a process for preparing boron and more particularly to an improvement in the process for preparing boron by the reduction of a boron halide with alkali metal.

One of the classical methods for the preparation of elemental boron involves the reduction of a boron halide by alkali metal. The reaction proceeds according to the equation $$BX_3 + 3M \rightarrow B + 3MX$$

where X=halogen, and M=alkali metal. In the prior art processes gaseous boron halide is brought into contact with a body of alkali metal at an elevated temperature. The reaction takes place at the surface of contact where boron is liberated and the alkali metal halide formed. While the reaction provides a useful way to prepare boron the processes heretofore known for carrying it out are not commercially practicable. They are batch processes in which all of the alkali metal is introduced at the start. The reaction does not go to completion due to the accumulation of products of reaction in the alkali metal and particularly at the surface thereof. The product is contaminated with unreacted alkali metal. Due in part to the accumulation of reaction products in the alkali metal reactant the rate of reaction is variable and the process difficult to control. This process is performed at relatively low temperature and produces only amorphous boron.

An object of the invention is to provide a commercially practicable process for making boron.

Another object is to provide a continuous process for preparing boron.

A further object is to provide a process for preparing boron in a consolidated or crystalline form.

Other objects of the invention will be in part obvious and in part pointed out hereinafter.

In accordance with the present invention a boron halide in gaseous form is caused to react with a gaseous dispersion of an alkali metal.

The preferred boron halide is boron trifluoride although the trichloride or other halide or mixture of halides can be used. The preferred alkali metal is sodium but potassium or other metal of this group, or alloys of two or more alkali metals, can be used.

The alkali metal dispersion can be in the form of a fine spray of molten metal in either an inert gas or in the boron halide gas. At moderate temperatures the boron halides do not readily react with alkali metal. Alternatively, the dispersion can be a mixture of alkali metal vapor and an inert gas. The two reactants in the process of the invention are essentially in the gaseous state and may be caused to react in a continuous manner. The reaction is started by raising the temperature of the mixture of reactants by suitable means but once started, being highly exothermic, it maintains itself. The rate and temperature of this reaction and the physical character of the boron can be controlled by regulating the rate of flow of the reactants and/or by employing inert gases as diluents. For the production of consolidated or crystalline boron it is desirable to have the reaction temperature as high as possible, preferably above 1500° C., and where this is the object of the process it is preferred not to use an inert gas.

The dispersion of the alkali metal in a gaseous medium can be prepared in several different ways. A body of alkali metal can be heated, for example to 1000° C., to increase the vapor pressure and the evolved vapor can be swept away from the surface by a current of gas which may be either inert gas or boron halide. Instead of passing the gas over the surface of the heated metal a stream of the gas can be bubbled through a liquid body of the metal and thus become saturated with the metal vapor. A dispersion where the alkali metal is in finely divided liquid form can be prepared by projecting a stream of molten metal through a scattering nozzle directly into a body of the boron halide gas which may or may not contain an inert gas diluent. A further method of preparing a dispersion of finely divided metal is to spray the molten metal through a mixing nozzle with a gas, either an inert gas or a boron halide. Still another method of preparing the dispersion is to introduce molten alkali metal dropwise or in the form of a small stream into a reaction chamber and causing the metal to impinge upon a heated surface which results in the vaporization of the metal. The metal vapor disperses in the gas of the chamber which may be the boron halide reactant. With reference to the inert gases referred to above it is to be observed that both alkali metals and boron are highly reactive so that the number of gases that are inert in this reaction are small. The gas may suitably be one of the rare gases such as helium, or others of this group, or it may be hydrogen which does not interfere with the reaction although it may form hydrides which are unstable at the temperature of the reaction.

The reaction product of the process is a mixture of elemental boron and the alkali metal halide. Alkali metal borides and free alkali metal may be found at times as impurities. The metal halide can be extracted from the reaction product by leaching with water. Alkali metal is also removed by the water treatment. Borides may be decomposed by acid treatment. Boron produced at low temperature is essentially amorphous and is in finely divided form. When produced by high temperature reaction substantial yields of consolidated or crystalline boron are obtained.

Referring now to the drawings, Figs. 1 to 5 inclusive illustrate diagrammatically apparatus that can be used for practicing the process of the invention, the five figures representing five modifications in the means for producing the alkali metal dispersion.

Referring specifically to Fig. 1, a quantity of sodium or other alkali metal is maintained in the vessel 10 which is heated by a suitable heater 11. The metal is maintained at a sufficient high temperature to produce a substantial vapor pressure of the metal in the vessel 10. Helium or other inert gas is introduced into the vessel 10 by means of a connection 12 and the mixture of helium and sodium vapor is removed from the vessel through the pipe 13 which introduces it into the reactor 14. Boron trifluoride or other boron halide gas is introduced into the reactor 14 through the connection 15. The reactor 14 is provided with a heating element 16 for the purpose of heating the reactants to the temperature required to initiate the reaction. A vent for the helium is provided at 17. In the operation of the device the mixture of helium and sodium vapor is brought into contact with the boron trifluoride in the reactor 14. The heating element 16 is energized to provide a local hot zone where the temperature of the gases is high enough for the reaction to start, preferably about 800° C. After the reaction starts sufficient heat is developed to make it unnecessary to continue heating by the resistance element. The reactants are introduced continuously, the helium being exhausted through the vent 17, and if desired returned to the system. Elemental boron and sodium fluoride collect on the floor of the reactor 14 and can be removed by suitable means. The reaction product is treated by leaching with water to remove the sodium fluoride.

Figure 2:
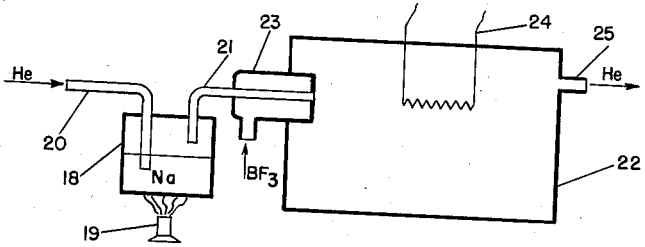

Referring now to Fig. 2 a modification is disclosed in which a body of sodium or other alkali metal is maintained in a vessel 18 which is heated by suitable device 19. The metal is maintained in liquid condition and a stream of helium or other inert gas is introduced below the surface of the metal through tube 20. The mixture of sodium vapor and helium collecting in the space above the surface of the sodium is withdrawn through the tube 21 into the reactor 22.

Boron trifluoride is introduced in gaseous form into the reactor 22 through the nozzle 23. Heating element 24 provides the heat to initiate the reaction. Helium is removed from the reactor through the pipe 25. The operation of this device is essentially the same as that described in connection with Fig. 1.

Figure 3:
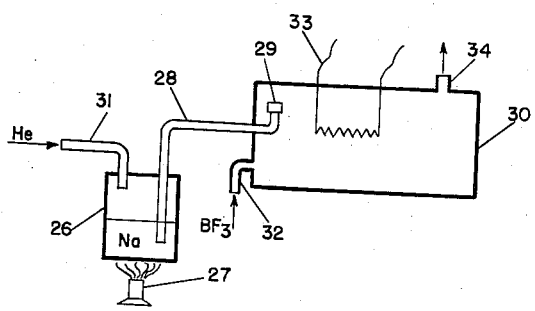

With reference to Fig. 3, a body of sodium is maintained in a vessel 26 and is heated to molten condition by a suitable heater 27. Liquid sodium is ejected from the vessel 26 through a tube 28 which is connected to the scattering nozzle 29 located in the reactor 30. Force to expel the liquid sodium from the vessel 26 is provided by helium introduced under pressure above the surface of the sodium through the pipe 31. Boron trifluoride is introduced into the reactor 30 through a connector 32. The operation of this device produces a fine dispersion of liquid sodium in boron trifluoride and reaction is initiated by resistance of element 33. A vent 34 provides for the removal of any inert gas that is introduced during the process. It is to be observed in connection with this form of the device that the scattering nozzle 29 must be of the type to produce a fine dispersion of the sodium since large particle size leads to surface reaction only and produces a product highly contaminated with the alkali metal. The alkali metals in molten form are liquids of high surface tension and this must be taken into consideration in the selection of suitable nozzles.

Figure 4:
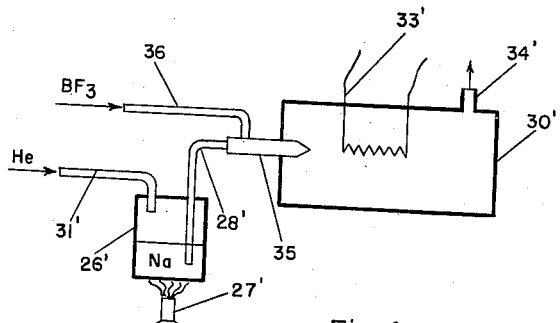

The device of Fig. 4 represents a modification of the device shown in Fig. 3 in that the sodium is dispersed by means of a mixing type spray nozzle employing boron trifluoride under pressure as the spraying gas. As in Fig. 3 the sodium is contained in a vessel 26' which is heated by a suitable heater 27'. Sodium is forced out of the vessel 26' through the tube 28' by the introduction of helium under pressure over the surface of the sodium through the tube 31'. The liquid sodium is carried to a mixing type spray nozzle 35 into which is also introduced boron trifluoride under pressure through the tube 36. The spraying nozzle may be of the internal or external mixing type. The spray of finely divided liquid sodium and boron trifluoride gas is projected into the reactor 30' where the electrical resistance 33' provides the high temperature required to initiate the reaction. Inert gas introduced during the process may be bled out through outlet 34'.

Figure 5:
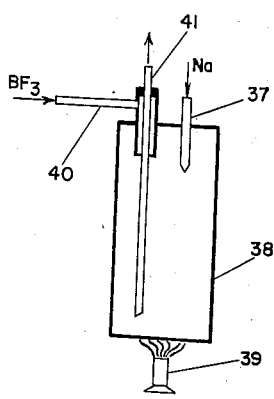

Referring now to Fig. 5, a form of the device is shown in which liquid sodium can be introduced through the nozzle 37 into the reactor 38, the bottom of which is maintained at a high temperature by means of a suitable heater 39. Liquid sodium at about 125° C. is introduced either dropwise or in the form of a fine stream so that upon striking the bottom of the reactor 38 heated to about 500° C., it will be partially vaporized. Boron trifluoride is introduced into the reactor 38 through tube 40. The temperature of the bottom of the reactor 38 is sufficiently high to initiate the reaction of the boron trifluoride and sodium vapor. The heat of reaction raises the temperature to at least 1000° C. thus increasing the vaporization of sodium. Inert gas introduced during the process can be removed through the tube 41. Reaction in this type of apparatus sometimes occurs with explosive violence where little or no inert gas is used.

In connection with the equipment employed in carrying out this process it is to be observed that both the alkali metal and the boron are reactive with a large number of materials, particularly under the temperature conditions prevailing in this reaction so that construction materials must be carefully selected. At the high temperatures found in the reactor boron is particularly active and has been observed to react with many of the construction materials normally employed for high temperature reactions. A highly suitable material for the reactors is boron carbide ($B_4C$), which withstands the high temperatures and is inert to boron. The reactor can be made of some other material and lined with boron carbide if desired.

The ingredients react in the stoichiometric ratio of 3 mols of the alkali metal to each mol of boron trifluoride or other boron trihalide used. The reactants can be introduced in this ratio, or in non-stoichiometric ratio where it is desirable for instance to use an excess of the boron halide as a coolant, as the spraying gas to disperse the alkali metal, or to direct the equilibrium of the reaction in the desired direction to reduce the production of by-products such as alkali metal borides.

For continuous operation, the reaction products accumulating in the reactor can be maintained above the melting point of the metal halide. The boron will float on the molten salt and the mass can be drained from the reactor as desired. The reactor may be designed so that the heat of the reaction maintains the product at a temperature above the melting point of the salt, or the bottom of the reactor can be heated by suitable external heating means.

Where a high temperature reaction is desirable, as where consolidated or crystalline boron is to be produced, the process exemplified in Figures 3 and 4 is preferred. By spraying liquid alkali metal a relatively high concentration of the metal is produced in the reactor. The gas introduced into the reactor should be substantially pure boron halide. Under these conditions the reaction is quite vigorous and proceeds at a temperature high enough to produce crystallization of the boron. Crystalline, or other high density form of boron is desirable over the amorphous form of the element. The amorphous form possesses a very great specific surface and is extremely difficult to purify and to keep pure for this reason. The crystalline form is readily kept in a pure state.

Since many embodiments might be made of the present invention and since many changes might be made in the embodiment described, it is to be understood that the foregoing description is to be interpreted as illustrative only and not in a limiting sense.

I claim:

1. The process for preparing elemental boron in high density form which comprises forming a fine dispersion of molten alkali metal in gaseous boron halide, and reacting the dispersed alkali metal with said boron halide.

2. The process for preparing elemental boron in high density form which comprises dispersing molten alkali metal in the form of a fine spray into gaseous boron halide, and reacting the dispersed alkali metal with said boron halide.

3. The process for preparing elemental boron in high density form which comprises spraying molten alkali metal with boron halide gas under pressure to form a dispersion of the alkali metal in the boron halide, and reacting the dispersed alkali metal and the said boron halide.

4. The process for preparing elemental boron in high density form which comprises spraying molten sodium with boron trifluoride gas under pressure to form a dispersion of sodium in the boron trifluoride, and reacting the dispersed sodium and the said boron trifluoride.

References Cited in the file of this patent

UNITED STATES PATENTS

| Number | Name | Date |
| --- | --- | --- |
| 1,306,568 | Weintraub | June 10, 1919 |
| 2,091,087 | Wempe | Aug. 24, 1937 |